United States Patent
Lee et al.

(10) Patent No.: US 10,892,930 B2
(45) Date of Patent: Jan. 12, 2021

(54) COMMUNICATION METHOD BASED ON PAPR AND TRANSMISSION APPARATUS AND RECEIVE APPARATUS USING THE SAME

(71) Applicant: Research & Business Foundation Sungkyunkwan University, Suwon-si (KR)

(72) Inventors: Kang Yoon Lee, Seoul (KR); Muhammad Riaz Ur Rehman, Suwon-si (KR); Truong Thi Kim Nga, Suwon-si (KR); Ali Imran, Suwon-si (KR); Hamed Abbasi Zadeh, Suwon-si (KR); Kwan Tae Kim, Suwon-si (KR); Sang Yun Kim, Suwon-si (KR); Dong In Kim, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/555,277

(22) Filed: Aug. 29, 2019

(65) Prior Publication Data
US 2020/0076662 A1    Mar. 5, 2020

(30) Foreign Application Priority Data
Aug. 30, 2018    (KR) .................... 10-2018-0102480

(51) Int. Cl.
*H04L 27/26*    (2006.01)

(52) U.S. Cl.
CPC ...... *H04L 27/2614* (2013.01); *H04L 27/2627* (2013.01); *H04L 27/2649* (2013.01); *H04L 27/2662* (2013.01)

(58) Field of Classification Search
CPC .. H02J 50/20; H04L 25/0202; H04L 27/2614; H04L 27/02; H04L 27/262; H04L 27/2626; H04L 27/2627; H04L 27/2649; H04L 27/2662; H04L 27/2666; H04L 27/2695; H04L 27/30
See application file for complete search history.

(56) References Cited

U.S. PATENT DOCUMENTS

| | | | | |
|---|---|---|---|---|
| 2004/0100897 A1* | 5/2004 | Shattil | ................ | H04L 27/2602 370/206 |
| 2004/0208260 A1* | 10/2004 | Chan | ................... | H03G 3/3042 375/297 |
| 2007/0280098 A1* | 12/2007 | Bhatt | ................ | H04L 27/2662 370/208 |
| 2008/0107161 A1* | 5/2008 | Xu | ...................... | H04W 52/346 375/224 |
| 2018/0026820 A1* | 1/2018 | Kim | ...................... | H04L 27/02 375/259 |

* cited by examiner

*Primary Examiner* — David B Lugo
(74) *Attorney, Agent, or Firm* — NSIP Law (57) ABSTRACT

Provided are a communication method based on a peak-to-average ratio (PAPR) and a transmission apparatus and a receive apparatus using the same and a communication method based on a peak-to-average ratio (PAPR) by a transmission apparatus according to an exemplary embodiment of the present disclosure includes: obtaining each of PAPR values corresponding to respective data symbols from a lookup table having a unique PAPR value; Generating a synchronization signal configured in a random sequence based on a the PAPR value of each data symbol; and transmitting the synchronization signal.

19 Claims, 8 Drawing Sheets

COMMUNICATION METHOD BASED ON PAPR AND TRANSMISSION APPARATUS AND RECEIVE APPARATUS USING THE SAME

CROSS-REFERENCE TO RELATED APPLICATIONS

This application claims the priority of Korean Patent Application No. 10-2018-0102480 filed on Aug. 30, 2018, in the Korean Intellectual Property Office, the disclosure of which is incorporated herein by reference.

BACKGROUND

1. Field

The present disclosure relates to a communication method based on a peak-to-average ratio (PAPR) and a transmission apparatus and a receive apparatus using the same, and more particularly, to a communication method based on a PAPR, which transmits digital information by using a PAPR value and automatically estimates parameters of PAPR based communication by a receive apparatus by using a PAPR value of a transmitted signal and a transmission apparatus and a receive apparatus using the same.

2. Description of Related Art

In a wireless communication system, information is transmitted by modulating an amplitude, a frequency, and a phase of a signal. In recent research, as a method for transmitting digital information of an IoT device focused on an RF Energy Harvesting field, a PAPR value of a transmission signal is used.

As described above, a concept of transmitting the digital information by using the PAPR value of a transmission signal is introduced.

However, there is no technique for automatically estimating a PAPR communication parameter using the PAPR value of the transmission signal in the receive apparatus.

Therefore, technological development is requested, which automatically estimates the PAPR communication parameter by using the PAPR value of the transmission signal to the receive apparatus.

As prior art related thereto, there is Korean Patent Registration No. 10-1829625 (Invention Title: Simultaneous Wireless Information and Power Transmission Method, Transmission Apparatus and Receive Apparatus using the Same).

SUMMARY

An object to be achieved by the present disclosure is to provide a communication method based on a PAPR, which may automatically estimate a PAPR communication parameter by using a PAPR value of a transmission signal by a receive apparatus and a transmission apparatus and a receive apparatus using the same.

Another object to be achieved by the present disclosure is to provide a communication method based on a PAPR, which may support both unidirectional and bidirectional communication modes and automatically synchronize a transmission apparatus and a receive apparatus and a transmission apparatus and a receive apparatus using the same.

The objects to be solved by the present disclosure are not limited to the aforementioned object(s), and other object(s), which are not mentioned above, will be apparent to a person having ordinary skill in the art from the following description.

An exemplary embodiment of the present disclosure provides a communication method based on a peak-to-average ratio (PAPR) by a transmission apparatus which includes: obtaining each of PAPR values corresponding to respective data symbols from a lookup table having a unique PAPR value; generating a synchronization signal configured in a random sequence based on the PAPR value of each data symbol; and transmitting the synchronization signal.

Preferably, the synchronization signal may be constituted by a first signal including information on timing synchronization and a second signal including information on PAPR waveform synchronization.

Preferably, the first signal may be a sequence form in which a PAPR waveform of a maximum value and a PAPR waveform of a minimum value among PAPR values of the data symbol are repeated as many times as N which is the total number of PAPR waveforms.

Preferably, when the number of bits per symbol of the data symbol is M, the total number of PAPR waveforms may be calculated by an equation below.

$$N=2^M \qquad \text{[Equation]}$$

Preferably, the second signal may be a sequence form in which the entire PAPR waveform corresponding to the total PAPR value of the data symbol is concatenated in a descending order of the PAPR value.

Preferably, in the transmitting of the synchronization signal, in the case of a unidirectional PAPR communication mode, the first signal may be transmitted during a timing synchronization period, the second signal may be transmitted during a PAPR waveform synchronization period, and the PAPR value of the data symbol may be transmitted during a data transmission period.

Preferably, in the transmitting of the synchronization signal, in the case of a bidirectional PAPR communication mode, the first signal may be transmitted during the timing synchronization period, the second signal may be transmitted during the PAPR waveform synchronization period, and the PAPR value of the data symbol may be transmitted during a PAPR preamble and the data transmission period at the time of receiving a synchronization acknowledgment signal including the PAPR preamble and the data transmission period from a receive apparatus.

Another exemplary embodiment of the present disclosure provides a method for communicating based on a PAPR by a receive apparatus, which includes: receiving a synchronization signal based on a PAPR value; estimating a PAPR communication parameter by analyzing the synchronization signal and loading the estimated PAPR communication parameter to a lookup table; and calculating a PAPR value of a data signal received during a data transmission period and comparing the calculated PAPR value with the PAPR value of the lookup table to demodulate a data symbol.

Preferably, the synchronization signal may be constituted by a first signal including information on timing synchronization and a second signal including information on PAPR waveform synchronization.

Preferably, the PAPR communication parameter may include at least one of a PAPR symbol rate, the total number of PAPR waveforms, a PAPR value of each PAPR waveform, and the total number of data symbols.

Preferably, the total number of PAPR waveforms may be calculated by counting a PAPR cycle in the first signal.

Preferably, the PAPR value of each PAPR waveform may be estimated from PAPR values connected in a descending order of the second signal and a binary value of 2M−1 and a binary value of '0' may be mapped to PAPR waveforms having a maximum value and a minimum value, respectively among the estimated PAPR values.

Preferably, the total number of data symbols may be calculated by using a data transmission period D which is a time difference between the end of the second signal and the start of a next first signal, and a symbol duration of the PAPR waveform.

Preferably, the method may further include: when the receive apparatus operates in a bidirectional PAPR communication mode, between the loading and the demodulating, generating a PAPR preamble constituted by the PAPR waveform corresponding to at least one of a maximum value, a minimum value, and a median value among the estimated PAPR values and transmitting, to a transmission apparatus, a synchronization acknowledgment signal including the PAPR preamble and the data transmission period.

Preferably, the method may further include: after the transmitting of the synchronization acknowledgment signal to the transmission apparatus, receiving, from the transmission apparatus, the PAPR waveform of the data signal during the PAPR preamble and the data transmission period.

Preferably, the demodulating of the data symbol may include calculating the PAPR value from the PAPR waveform of the data signal, comparing the calculated PAPR value with the PAPR value of the lookup table, and estimating a binary value corresponding to a PAPR value matched in the lookup table.

Yet another exemplary embodiment of the present disclosure provides a transmission apparatus which includes: a PAPR modulating unit obtaining a PAPR value corresponding to each data symbol from a lookup table having a unique PAPR value, respectively and generating a synchronization signal configured in a random sequence based on the PAPR value of each data symbol; and a communication unit transmitting the synchronization signal through an antenna.

Preferably, the communication unit may transmit the synchronization signal during a synchronization period and transmits a PAPR waveform corresponding to the PAPR value of the data symbol during a data transmission period when operating in a unidirectional PAPR communication mode, and transmits the synchronization signal during the synchronization period and transmit the PAPR waveform corresponding to the PAPR value of the data symbol during a data transmission period of a synchronization acknowledgment signal at the time of receiving the synchronization acknowledgment signal from a receive apparatus, when operating in a bidirectional PAPR communication mode.

Still yet another exemplary embodiment of the present disclosure provides a receive apparatus which includes: a communication unit receiving a synchronization signal based on a PAPR value; an estimation unit estimating a PAPR communication parameter by analyzing the synchronization signal and loading the estimated PAPR communication parameter to a lookup table; and a PAPR demodulating unit calculating a PAPR value of a data signal received during a data transmission period and comparing the calculated PAPR value with the PAPR value of the lookup table to demodulate a data symbol.

Preferably, the receive apparatus may further include: when the receive apparatus operates in a bidirectional PAPR communication mode, a synchronization checking unit generating a PAPR preamble constituted by PAPR waveforms corresponding to a maximum value, a minimum value, and a median value among the estimated PAPR values and transmitting, to a transmission apparatus, a synchronization acknowledgment signal including the PAPR preamble and a data transmission period.

Preferably, the communication unit may receive, from the transmission apparatus, a data signal including the PAPR preamble and the PAPR waveform of the corresponding data symbol or transmit, to the transmission apparatus, a data signal including the PAPR preamble and a PAPR waveform of a data symbol to be transmitted.

According to the present disclosure, a PAPR communication parameter can be automatically using a PAPR value of a transmission signal.

Further, according to the present disclosure, a receive apparatus may be automatically synchronized with all transmission apparatuses which support PAPR based communication without prior information of communication parameters. Accordingly, the receive apparatus may receive broadcast information from the transmission apparatus or start bidirectional communication in an efficient scheme.

Meanwhile, the effects of the present disclosure are not limited to the above-mentioned effects, and various effects can be included within the scope which is apparent to those skilled in the art from contents to be described below.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure may have various modifications and various embodiments and specific embodiments will be illustrated in the drawings and described in detail. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 1:
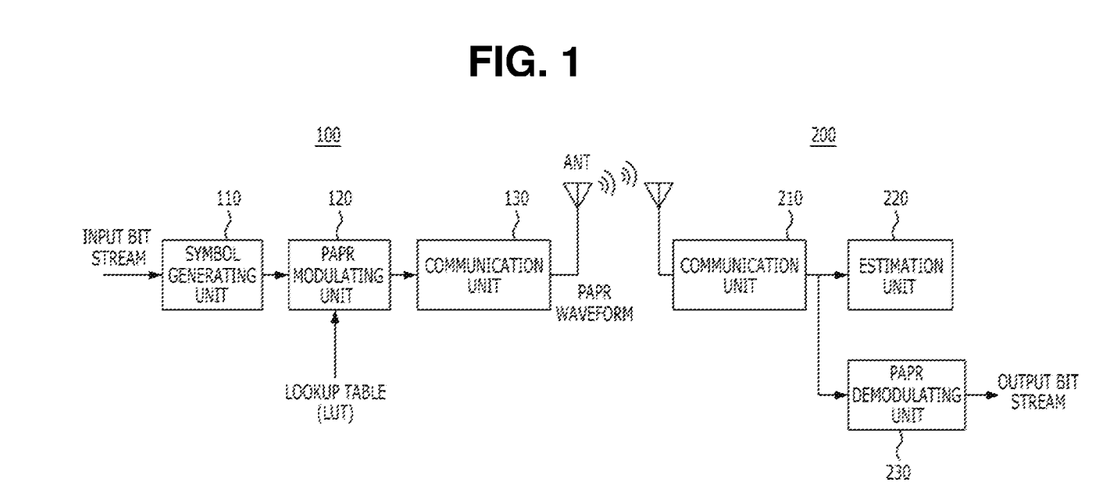
FIG. 1 is a diagram for describing a communication system based on a PAPR according to an exemplary embodiment of the present disclosure.
Figure 2:
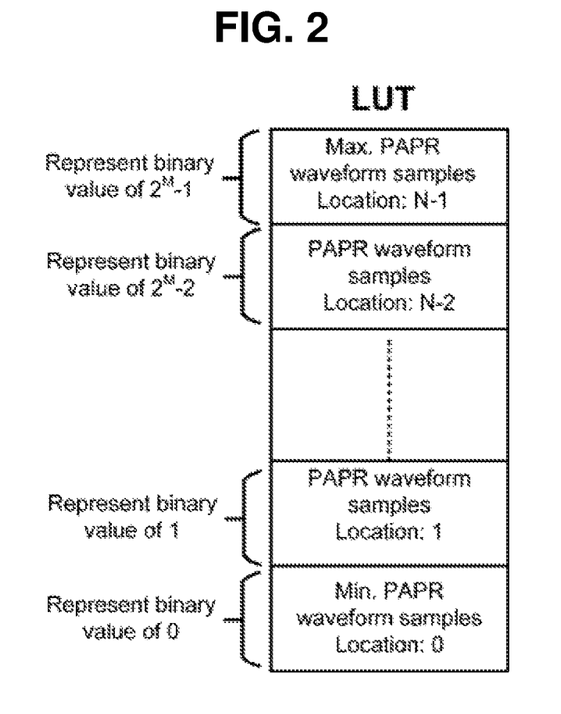
FIG. 2 is a diagram for describing a lookup table of a transmission apparatus according to an exemplary embodiment of the present disclosure.
Figure 3:
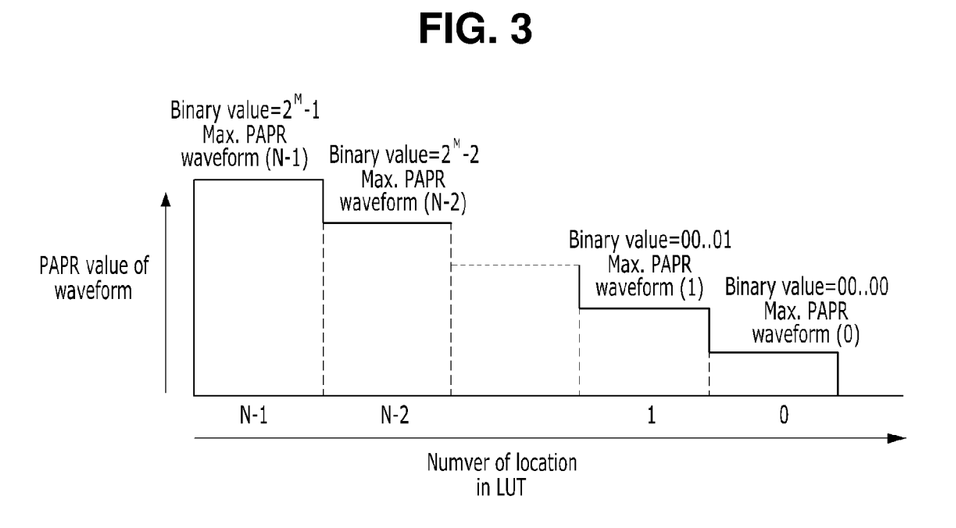
FIG. 3 is a diagram for describing a PAPR waveform and a binary value according to an exemplary embodiment of the present disclosure.
Figure 4:
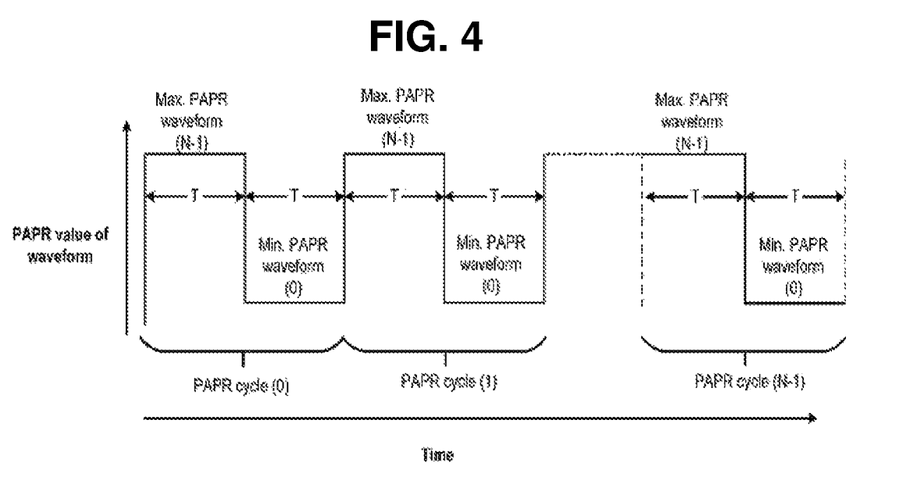
FIG. 4 is a diagram for describing a first signal of a synchronization signal according to an exemplary embodiment of the present disclosure.
Figure 5:
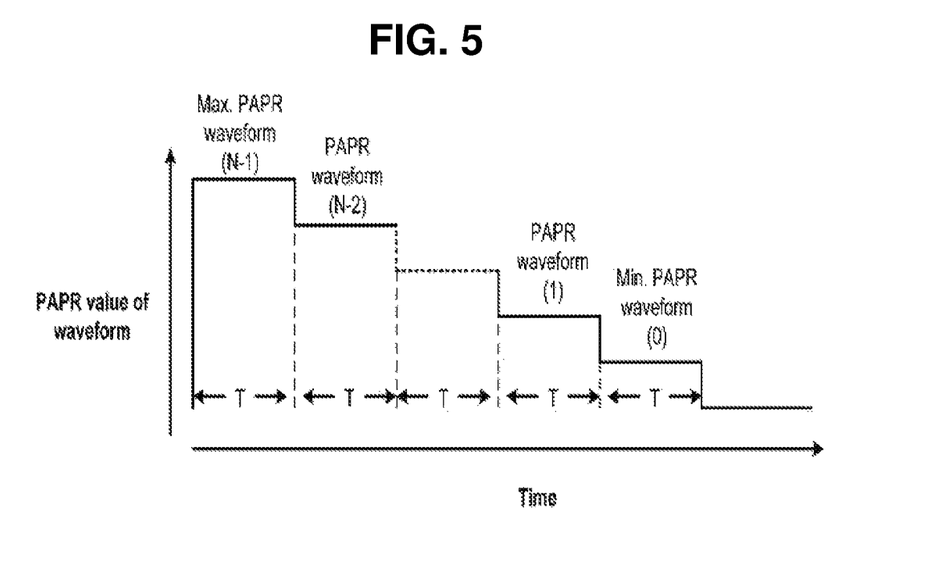
FIG. 5 is a diagram for describing a second signal of a synchronization signal according to an exemplary embodiment of the present disclosure.
Figure 6:
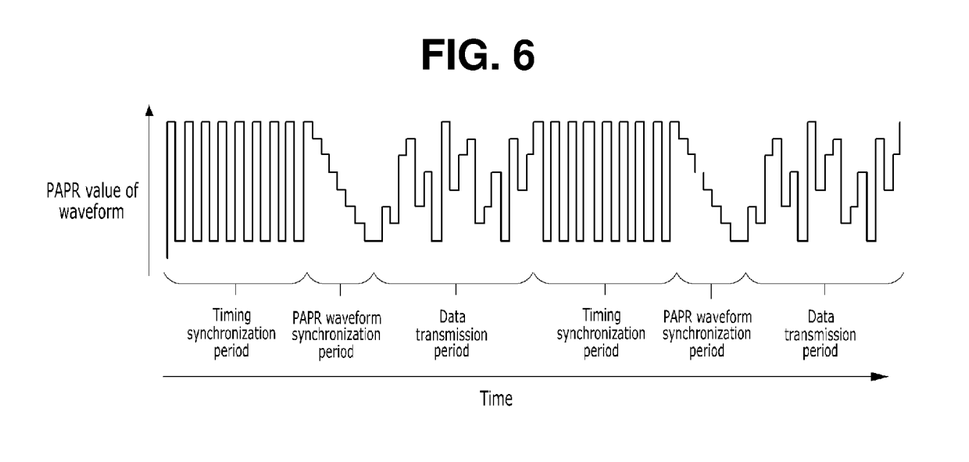
FIG. 6 is a diagram for describing data transmission in a unidirectional PAPR communication mode according to an exemplary embodiment of the present disclosure.
Figure 7:
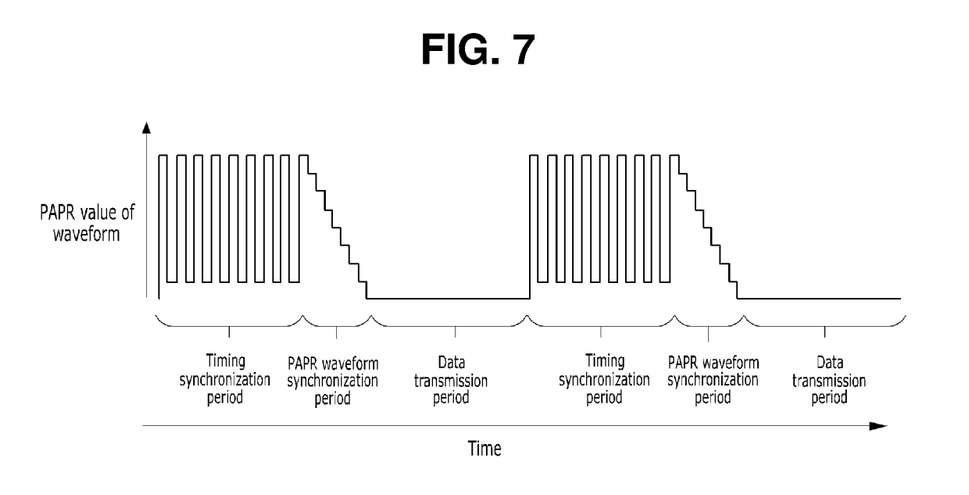
FIG. 7 is a diagram for describing a synchronization signal in a bidirectional PAPR communication mode according to an exemplary embodiment of the present disclosure.
Figure 8:
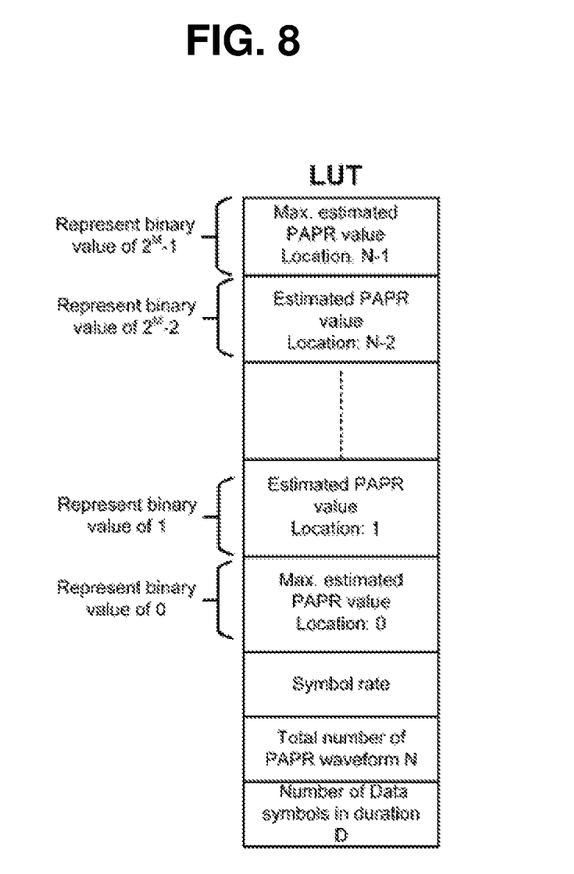
FIG. 8 is a diagram for describing a lookup table of a receive apparatus according to an exemplary embodiment of the present disclosure.
Figure 9:
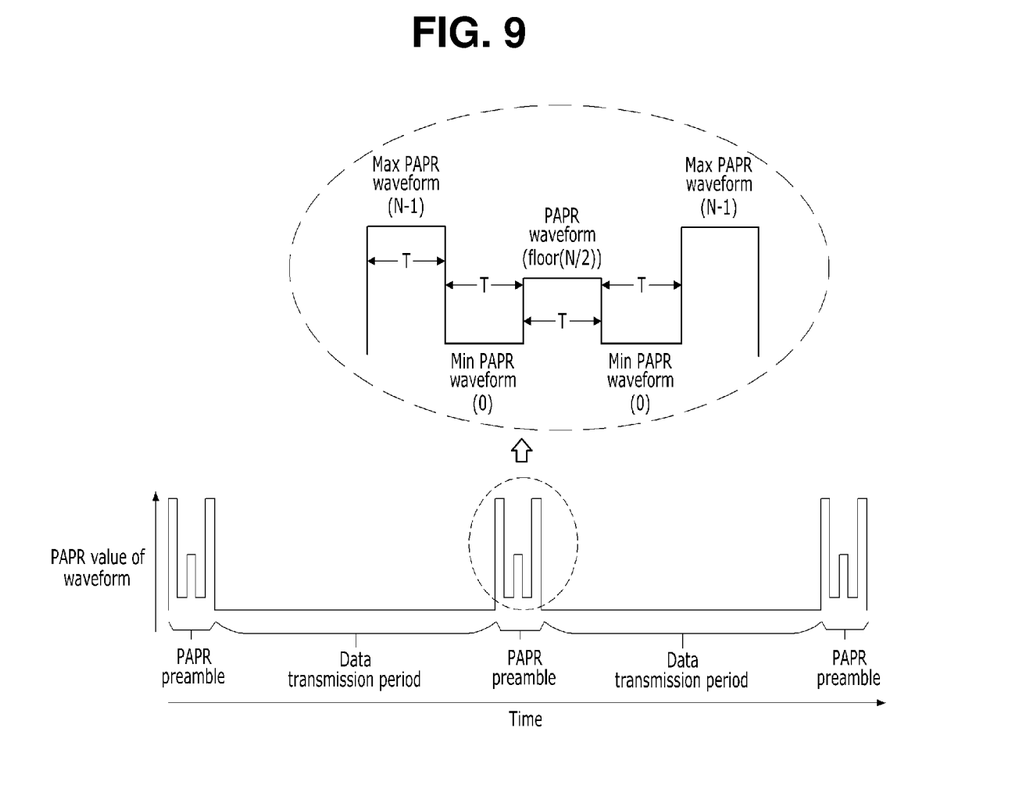
FIG. 9 is a diagram for describing a synchronization acknowledgment signal according to an exemplary embodiment of the present disclosure.
Figure 10:
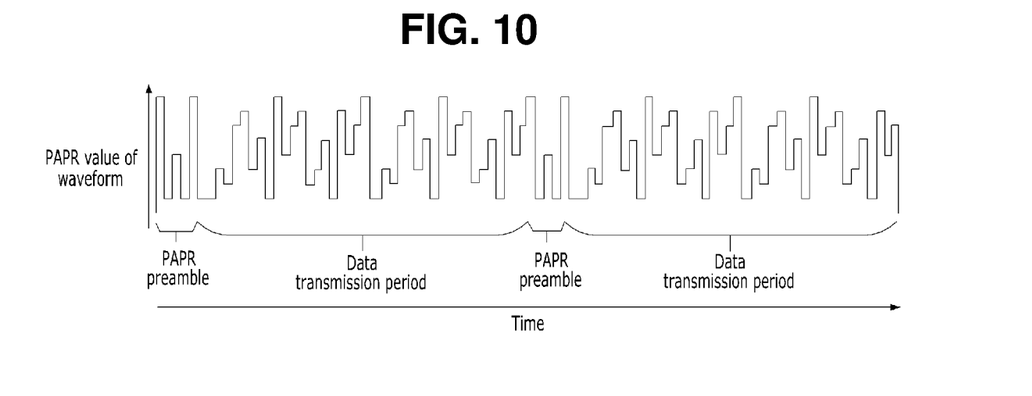
FIG. 10 is a diagram for describing data transmission in a bidirectional PAPR communication mode according to an exemplary embodiment of the present disclosure.

FIG. 1 is a diagram for describing a communication system based on a PAPR according to an exemplary embodiment of the present disclosure, FIG. 2 is a diagram for describing a lookup table of a transmission apparatus according to an exemplary embodiment of the present disclosure, FIG. 3 is a diagram for describing a PAPR waveform and a binary value according to an exemplary embodiment of the present disclosure, FIG. 4 is a diagram for describing a first signal of a synchronization signal according to an exemplary embodiment of the present disclosure, FIG. 5 is a diagram for describing a second signal of a synchronization signal according to an exemplary embodiment of the present disclosure, FIG. 6 is a diagram for describing data transmission in a unidirectional PAPR communication mode according to an exemplary embodiment of the present disclosure, FIG. 7 is a diagram for describing a synchronization signal in a bidirectional PAPR communication mode according to an exemplary embodiment of the present disclosure, FIG. 8 is a diagram for describing a lookup table of a receive apparatus according to an exemplary embodiment of the present disclosure, FIG. 9 is a diagram for describing a synchronization acknowledgment signal according to an exemplary embodiment of the present disclosure, and FIG. 10 is a diagram for describing data transmission in a bidirectional PAPR communication mode according to an exemplary embodiment of the present disclosure.

Referring to FIG. 1, a communication system based on a PAPR according to an exemplary embodiment of the present disclosure includes a transmission apparatus 100 transmitting digital information using a PAPR value and a receive apparatus 200 automatically estimating PAPR communication parameters using the PAPR value.

The transmission apparatus 100 transmits digital data through PAPR modulation by allocating a PAPR waveform stored in a lookup table (LUT) having a unique PAPR value to each data symbol.

The transmission apparatus 100 may operate in two states of a synchronous state and a data state and a PAPR communication mode may adopt a unidirectional mode and a bidirectional mode.

In the case of the unidirectional mode, the transmission apparatus 100 operates in the synchronous state and transmits data together with a synchronizing signal. Further, in the case of the bidirectional mode, the transmission apparatus 100 initially operates in the synchronous state and transmits the synchronization signal and when receiving a synchronization acknowledgment signal from the receive apparatus 200, the transmission apparatus 100 is switched to the data state and transmits the data to the receive apparatus 200.

The transmission apparatus 100 includes a symbol generating unit 110, a PAPR modulating unit 120, and a communication unit 130.

The symbol generating unit 110 receives an input bit stream and generates at least one data symbol. In this case, the data symbol is formed in the input bit stream according to M which is the number of bits per symbol.

The PAPR modulating unit 120 obtains a PAPR value corresponding to each data symbol from a lookup table (LUT) having a unique PAPR value, respectively, and generates the synchronization signal configured in a random sequence based on the PAPR value of each data symbol.

That is, the PAPR modulating unit 120 allocates each of the data symbols generated by the symbol generating unit 110 to the PAPR waveform stored in the lookup table having the unique PAPR value. In this case, the total number of PAPR waveforms is generated according to the value of M, which is the number of bits per symbol of the data symbol. That is, N which is the total number of PAPR waveforms may be calculated using Equation 1 below.

$$N=2^M \qquad \text{[Equation 1]}$$

As illustrated in FIG. 2, each PAPR waveform to which the data symbol is allocated may be arranged in an ascending order in the lookup table. The PAPR waveform having the lowest PAPR value is allocated at position 0 and the PAPR waveform having the highest PAPR value is allocated at position N−1.

As such, the PAPR modulating unit 120 encodes the data symbol to the PAPR value of the PAPR waveform. That is, since each PAPR waveform has the unique PAPR value, each data symbol corresponds to each PAPR waveform. Therefore, the PAPR waveform according to the position in the lookup table may be represented by a binary value as illustrated in FIG. 3. For example, the PAPR waveform stored at position 0 in the LUT represents the binary 0 of M bits and the PAPR waveform stored at position N−1 in the LUT may represent a binary value of 2M−1.

Further, the PAPR modulating unit 120 generates the synchronization signal configured in the random sequence based on the PAPR value of each data symbol. Here, the synchronization signal is constituted by a first signal including information on timing synchronization and a second signal including information on PAPR waveform synchronization.

The first signal may be a contiguous sequence form in which a PAPR waveform of a maximum value and a PAPR waveform of a minimum value among PAPR values of the data symbol are repeated as many times as N which is the total number of PAPR waveforms. The first signal as a signal used for recovering a symbol timing in the receive apparatus 200 may be a form illustrated in FIG. 4. Referring to FIG. 4, the first signal may be a sequence in which a PAPR waveform at position N−1 having a maximum PAPR value and a PAPR waveform at position 0 having a minimum PAPR value are repeated in a PAPR period. In this case, the number of PAPR periods is equal to N which is the total number of PAPR waveforms in a timing synchronization period. Then, the receive apparatus 200 may calculate the total number of PAPR waveforms used for PAPR-based communication by simply counting the PAPR period during the timing synchronization period. A timing synchronization period $T_{TSP}$ during which the first signal is transmitted may be calculated using Equation 2 below.

$$T_{TSP}=2\times T\times N \qquad \text{[Equation 2]}$$

Here, T represents a symbol duration of the PAPR waveform and N represents the total number of PAPR waveforms.

The second signal may be a contiguous sequence form in which the entire PAPR waveform corresponding to the total PAPR value of the data symbol is concatenated in a descending order of the PAPR value. The second signal may be a form illustrated in FIG. 5. Referring to FIG. 5, the second signal is a form in which all of the PAPR waveforms of the data symbol are transmitted in the descending order of the PAPR values of the PAPR waveforms at a PAPR symbol interval T during the PAPR waveform synchronization period. Then, since the receive apparatus 200 calculates the PAPR value of each PAPR waveform at the PAPR symbol interval T and already calculated the total PAPR waveform number in the PAPR waveform synchronization period, the total number of PAPR waveforms transmitted in the descending order of the PAPR value during the PAPR waveform synchronization period may be checked.

The communication unit 130 transmits the synchronization signal and the PAPR waveform of the data symbol through an antenna. In this case, the communication unit 130 may perform different operations according to the unidirectional PAPR communication mode and the bidirectional PAPR communication mode.

First, when operating in the unidirectional PAPR communication mode, the communication unit 130 transmits the first signal during the timing synchronization period, transmits the second signal during the PAPR waveform synchronization period, and transmits the PAPR waveform corresponding to the data symbol during a data transmission period.

That is, when the transmission apparatus 100 operates in the unidirectional PAPR communication mode, the communication unit 130 transmits data in a format illustrated in FIG. 6. First, referring to FIG. 6, when operating in the unidirectional PAPR communication mode, the communication unit 130 transmits the first signal during the timing synchronization period, transmits the second signal during the PAPR waveform synchronization period, and transmits the PAPR value of the data symbol during the data transmission period. In this case, a duration of a data transmission period D may be obtained by calculating a time difference between the end of the PAPR waveform synchronization period and the start of the next timing synchronization period.

Next, when operating in the bidirectional PAPR communication mode, the communication unit 130 transmits the first signal during the timing synchronization period and transmits the second signal during the PAPR waveform synchronization period, and when receiving the synchronization acknowledgment signal from the receive apparatus 200, the communication unit 130 transmits the PAPR waveform corresponding to the data symbol during the data transmission period.

That is, when the transmission apparatus 100 operates in the bidirectional PAPR communication mode, the communication unit 130 may transmit the data symbol only when the communication unit 130 does not transmit the PAPR waveform during the data transmission period as illustrated in FIG. 7 and receives the synchronization acknowledgment signal from the receive apparatus 200. The synchronization acknowledgment signal will be described below. When the synchronization acknowledgment signal is received, the transmission apparatus is switched to the data mode and performs data communication with the receive apparatus 200 in a data transmission format illustrated in FIG. 10. That is, when the transmission apparatus 100 operates in the bidirectional PAPR communication mode, the transmission apparatus 100 and the receive apparatus 200 performs data communication in a data transmission format constituted by a PAPR preamble and the data transmission period as illustrated in FIG. 10.

The receive apparatus 200 receives the synchronization signal based on the PAPR value, analyzes the synchronization signal to estimate the PAPR communication parameter, calculates the PAPR value of the received data signal during the data transmission period, and compares the calculated PAPR value with the estimated PAPR value to demodulate the data symbol.

The receive apparatus 200 includes a communication unit 210, an estimation unit 220, and a PAPR demodulating unit 230.

The communication unit 210 receives the synchronization signal based on the PAPR value through the antenna. That is, the communication unit 210 receives, from the transmission apparatus 100, a synchronization signal constituted by a first signal including information on timing synchronization and a second signal including information on PAPR waveform synchronization. Since the synchronization signal is described above, the synchronization signal will be omitted.

The estimation unit 220 analyzes the synchronization signal to estimate the PAPR communication parameters, and loads the estimated PAPR communication parameters to the lookup table. Here, the PAPR communication parameters may include a PAPR symbol rate, the total number of PAPR waveforms, a PAPR value of each PAPR waveform, the total number of data symbols, and the like.

Specifically, the estimation unit 220 may calculate the total number of PAPR waveforms by counting the PAPR period in the first signal received during the timing synchronization period. That is, since the first signal is a sequence in which a PAPR waveform of a maximum value and a PAPR waveform of a minimum value among PAPR values of the data symbol are repeated as many times as N which is the total number of PAPR waveforms, the estimation unit 220 may calculate the total number of PAPR waveforms by counting the PAPR period. For example, when a first signal having four periods is received, the total number of PAPR waveforms may be 4.

The calculated total number of PAPR waveforms may be checked in the second signal received during the PAPR waveform synchronization period.

Further, the estimation unit 220 estimates the PAPR value of each PAPR waveform from the PAPR values connected in the descending order of the second signal received during the PAPR waveform synchronization period and maps the binary value of 2M−1 and the binary value of '0' to the PAPR waveforms having the maximum and minimum values among the estimated PAPR values. That is, since the second signal is a sequence in which all PAPR waveforms corresponding to all PAPR values of the data symbol are concatenated in the descending order of the PAPR value, the estimation unit 220 may calculate the PAPR value of each PAPR waveform at the PAPR symbol interval T. Since the estimation unit 220 already calculated the total number of PAPR waveforms in the timing synchronization period, the total number of PAPR waveforms transmitted in the descending order of the PAPR value in the PAPR waveform synchronization period may be checked.

Further, the estimation unit 220 calculates the total number of data symbols using the data transmission period D which is the time difference between the end of the second signal and the start of the next first signal, and the symbol duration of the PAPR waveform. That is, the estimation unit 220 may calculate the time difference between the end of the PAPR waveform synchronization period and the start of the next timing synchronization period as the data transmission period D and calculate the number of data symbols by using the data transmission period and the symbol duration of the PAPR waveform.

The estimation unit 220 may calculate the total number of data symbols using Equation 3 below.

$$\text{Number of data symbols} = \frac{D}{T} \quad \text{[Equation 3]}$$

The estimation unit 220 may verify the estimated PAPR communication parameters a predetermined number of times or more (e.g., 3 times). After the verification, the estimation unit 220 may load all PAPR communication parameters to the lookup table (LUT) of the receive apparatus 200. That is, the estimation unit 220 updates the PAPR communication parameter to the lookup table as illustrated in FIG. 8.

The PAPR demodulating unit 230 calculates the PAPR value of the received data signal during the data transmission period and compares the calculated PAPR value with the PAPR value of the lookup table to demodulate the data symbol. That is, the PAPR demodulating unit 230 calculates the PAPR value from the PAPR waveform received during the data transmission period and compares the calculated PAPR value with the PAPR value of the lookup table to demodulate the data symbol by accessing the binary value corresponding to the PAPR value matched in the lookup table.

Meanwhile, the receive apparatus 200 may perform different operations according to the unidirectional PAPR communication mode and the bidirectional PAPR communication mode.

First, when operating in the unidirectional PAPR communication mode, the receive apparatus 200 starts to receive data during the data transmission period after the estimation of the PAPR communication parameters is completed. In this case, the synchronization acknowledgment signal is not required and the transmission apparatus 100 may broadcast the amount of information to a plurality of receive apparatuses.

Next, when operating in the bidirectional PAPR communication mode, the receive apparatus 200 starts to receive data during the data transmission period after transmitting the synchronization acknowledgment signal to the transmission apparatus 100 when the estimation of the PAPR communication parameters is completed.

Therefore, the receive apparatus 200 may further include a synchronization checking unit (not illustrated) that generates a PAPR preamble constituted by PAPR waveforms corresponding to a maximum value, a minimum value, and a median value among the estimated PAPR values and transmits the synchronization acknowledgment signal including the PAPR preamble and the data transmission period to the transmission apparatus 100. The synchronization acknowledgment signal includes the PAPR preamble and the data transmission period as illustrated in FIG. 9. In this case, the PAPR preamble may be constituted by three PAPR waveforms stored at positions (N−1), floor (N/2), and (0) in the lookup table, respectively.

When the receive apparatus 100 operates in the bidirectional PAPR communication mode, the receive apparatus 200 performs data communication in the data transmission format constituted by the PAPR preamble and the data transmission period as illustrated in FIG. 10 after transmitting the synchronization acknowledgment signal to the transmission apparatus 100. In this case, the receive apparatus 200 transmits the data symbol in the PAPR waveform during the data transmission period.

Figure 11:
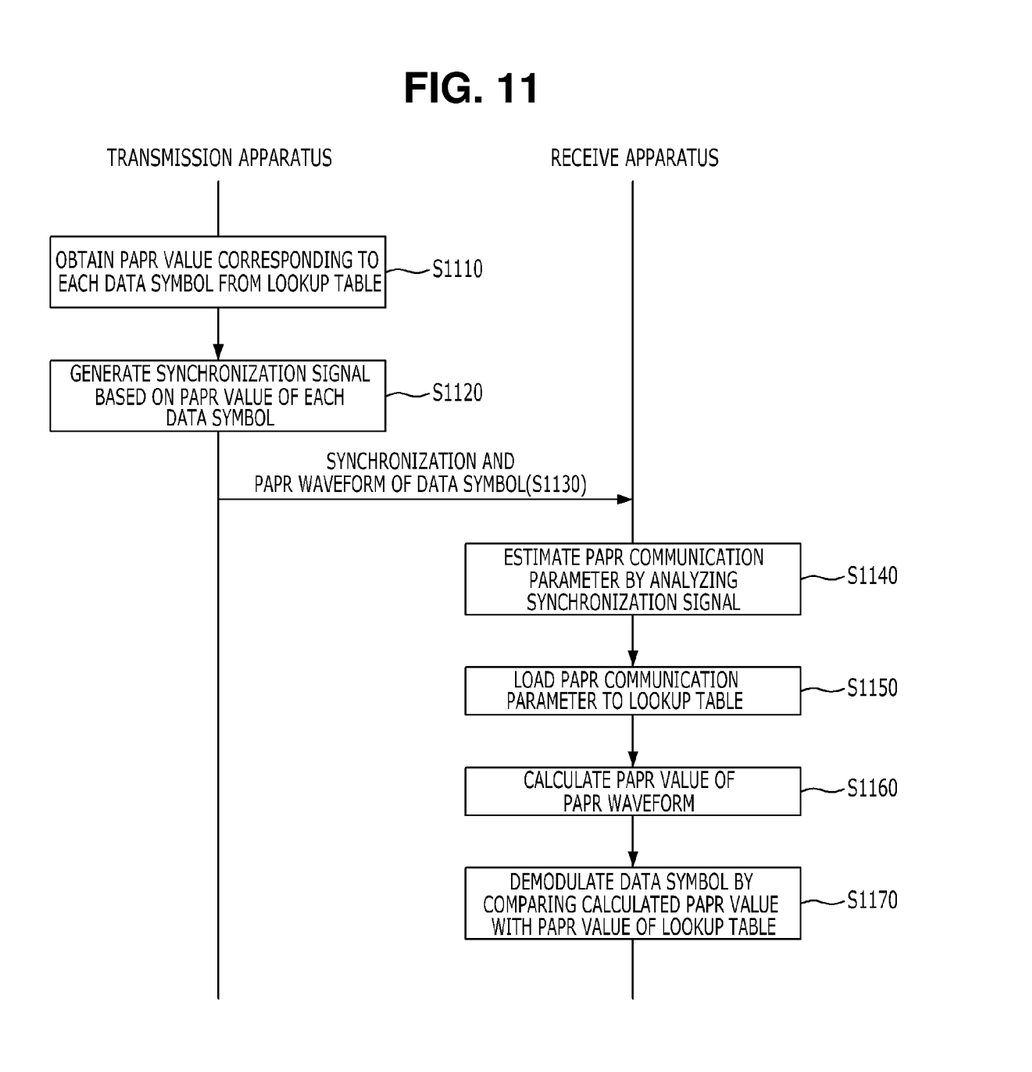
FIG. 11 is a diagram for describing a communication method based on a PAPR in a unidirectional mode according to an exemplary embodiment of the present disclosure.

FIG. 11 is a diagram for describing a communication method based on a PAPR in a unidirectional mode according to an exemplary embodiment of the present disclosure.

Referring to FIG. 11, the transmission apparatus obtains a PAPR value corresponding to each data symbol from a lookup table (LUT) having a unique PAPR value (S1110), respectively and generates the synchronization signal configured in a random sequence based on the PAPR value of each data symbol (S1120).

Then, the transmission apparatus sequentially transmits the synchronization signal and the PAPR waveform corresponding to the data symbol to the receive apparatus (S1130). That is, the transmission apparatus transmits the synchronization signal during the synchronization period and transmits the PAPR waveform of the data symbol during the data transmission period as illustrated in FIG. 6.

When step S1130 is performed, the receive apparatus analyzes the synchronization signal from the transmission apparatus to estimate the PAPR communication parameter (S1140) and loads the estimated PAPR communication parameter to the lookup table (S1150).

Then, the receive apparatus calculates the PAPR value of the received PAPR waveform during the data transmission period (S1160) and compares the calculated PAPR value with the PAPR value of the lookup table to demodulate the data symbol (S1170). In this case, when there is a PAPR value in the lookup table, which matches the calculated PAPR value, the receive apparatus converts the calculated PAPR value into the binary value corresponding to the matched PAPR value. Then, the data transmitted in the PAPR waveform is demodulated into the data symbol of the binary value.

Figure 12:
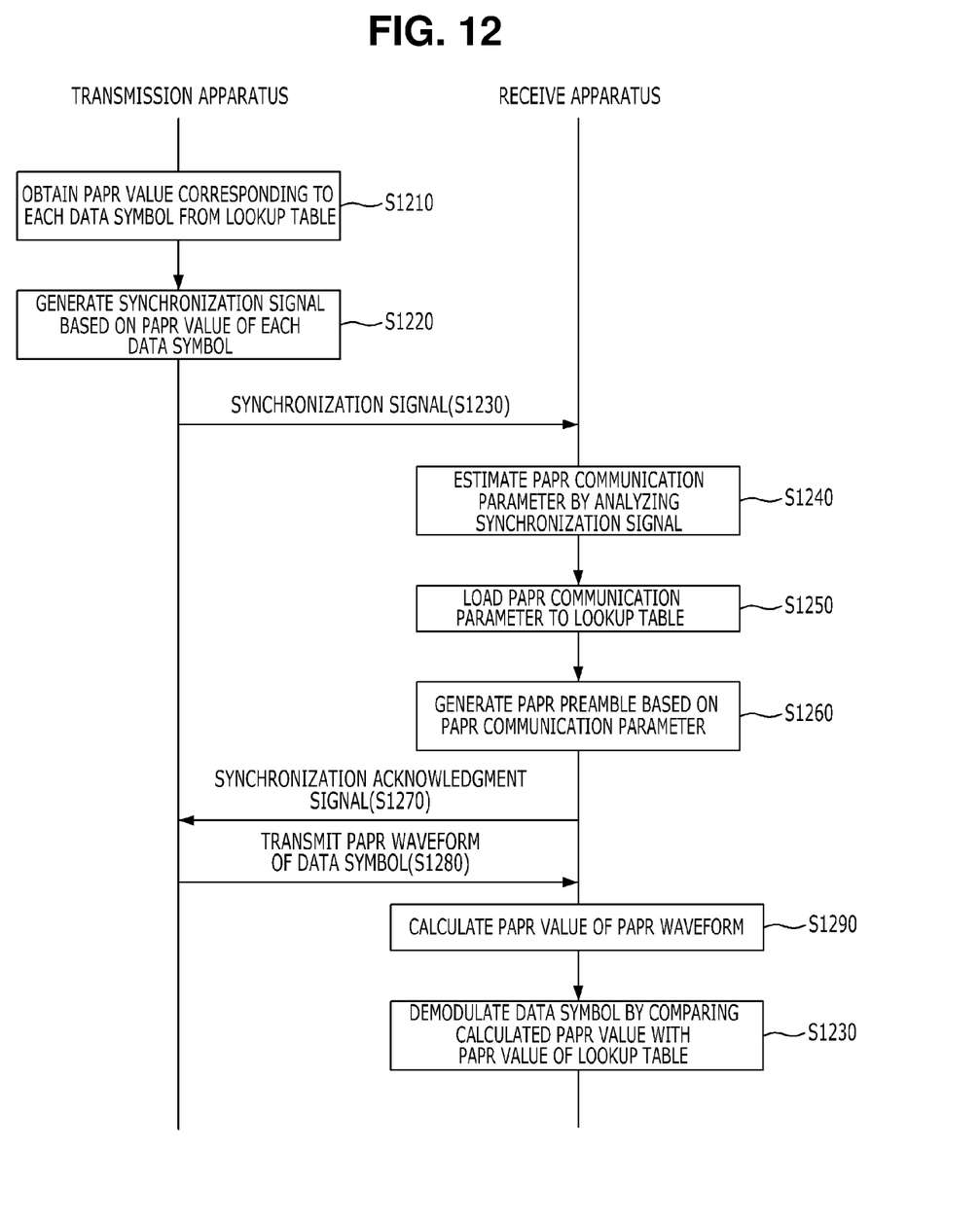
FIG. 12 is a diagram for describing a communication method based on a PAPR in a bidirectional mode according to an exemplary embodiment of the present disclosure.

FIG. 12 is a diagram for describing a communication method based on a PAPR in a bidirectional mode according to an exemplary embodiment of the present disclosure.

Referring to FIG. 12, the transmission apparatus obtains a PAPR value corresponding to each data symbol from a lookup table (LUT) having a unique PAPR value, respectively (S1210) and generates the synchronization signal configured in a random sequence based on the PAPR value of each data symbol (S1220).

Then, the transmission apparatus transmits the synchronization signal to the receive apparatus (S1230). In this case, the transmission apparatus transmits the synchronization signal during the synchronization period and does not transmit data during the data transmission period as illustrated in FIG. 7.

When step S1230 is performed, the receive apparatus analyzes the synchronization signal received from the transmission apparatus to estimate the PAPR communication parameter (S1240) and loads the estimated PAPR communication parameter to the lookup table (S1250).

Then, the receive apparatus generates the PAPR preamble based on the estimated PAPR communication parameter (S1260) and transmits the synchronization acknowledgment signal including the PAPR preamble to the transmission apparatus (S1270). That is, the receive apparatus generates the PAPR preamble constituted by the PAPR waveforms corresponding to the maximum value, the minimum value, and the median value among the estimated PAPR values and transmits, to the transmission apparatus, the synchronization acknowledgment signal including the PAPR preamble and the data transmission period as illustrated in FIG. 9.

When step S1270 is performed, the transmission apparatus is switched to the data state and transmits, to the receive apparatus, the PAPR waveform corresponding to the data symbol (S1280). In this case, the transmission apparatus may perform data transmission and reception in the format constituted by the PAPR preamble and the data transmission period as illustrated in FIG. 10. The receive apparatus may also transmits data to the transmission apparatus in the format illustrated in FIG. 10.

When step S1280 is performed, the receive apparatus calculates the PAPR value of the received PAPR waveform during the data transmission period (S1290) and compares the calculated PAPR value with the PAPR value of the lookup table to demodulate the data symbol (S1230). In this case, when there is a PAPR value in the lookup table, which matches the calculated PAPR value, the receive apparatus converts the calculated PAPR value into the binary value corresponding to the matched PAPR value. Then, the data transmitted in the PAPR waveform is demodulated into the data symbol of the binary value.

When there is data which the receive apparatus intends to transmit to the transmission apparatus after step S1230 is performed, the receive apparatus may transmit the data to the transmission apparatus in the format illustrated in FIG. 10.

As described above, according to the present disclosure, the receive apparatus uses the PAPR value of the transmitted signal to automatically estimate parameters of PAPR based communication. Further, the receive apparatus may be automatically synchronized with all transmission apparatuses which support the PAPR based communication without prior information of the communication parameters. Accordingly, the receive apparatus may receive broadcast information from the transmission apparatus or start bidirectional communication in an efficient scheme.

The present disclosure has been described above with reference to preferred embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

What is claimed is:

1. A method for communicating based on a peak-to-average ratio (PAPR) by a transmission apparatus, the method comprising:
   obtaining each of PAPR values corresponding to respective data symbols from a lookup table having a plurality of PAPR values;
   generating a synchronization signal configured in a random sequence based on the PAPR value of each data symbol; and
   transmitting the synchronization signal,
   wherein the synchronization signal is constituted by a first signal including information on timing synchronization and a second signal including information on PAPR waveform synchronization.

2. The method according to claim 1, wherein the first signal is a sequence form in which a PAPR waveform of a maximum value and a PAPR waveform of a minimum value among the PAPR values of the data symbol are repeated as many times as N which is the total number of PAPR waveforms.

3. The method according to claim 2, wherein when the number of bits per symbol of the data symbol is M, the total number of PAPR waveforms, N, is calculated by: $N=2^M$.

4. The method according to claim 1, wherein the second signal is a sequence form in which the entire PAPR waveform corresponding to the total PAPR value of the data symbol is concatenated in a descending order of the PAPR value.

5. The method according to claim 1, wherein in the transmitting of the synchronization signal, in the case of a unidirectional PAPR communication mode, the first signal is transmitted during a timing synchronization period, the second signal is transmitted during a PAPR waveform synchronization period, and the PAPR value of the data symbol is transmitted during a data transmission period.

6. The method according to claim 1, wherein in the transmitting of the synchronization signal, in the case of a bidirectional PAPR communication mode, the first signal is transmitted during a timing synchronization period, the second signal is transmitted during a PAPR waveform synchronization period, and the PAPR value of the data symbol is transmitted during a PAPR preamble and a data transmission period at the time of receiving a synchronization acknowledgment signal including the PAPR preamble and the data transmission period from a receive apparatus.

7. A method for communicating based on a peak-to-average ratio (PAPR) by a receive apparatus, the method comprising:
receiving a synchronization signal based on a PAPR value, wherein the synchronization signal is constituted by a first signal including information on timing synchronization and a second signal including information on PAPR waveform synchronization;
estimating a PAPR communication parameter by analyzing the synchronization signal and loading the estimated PAPR communication parameter to a lookup table; and
demodulating a data signal, received during a data transmission period, to a data symbol by calculating a PAPR value of the received data signal and by comparing the calculated PAPR value, of the received data signal, with PAPR values of the lookup table.

8. The method according to claim 7, wherein the PAPR communication parameter includes at least one of a PAPR symbol rate, the total number of PAPR waveforms, a PAPR value of each PAPR waveform, and the total number of data symbols.

9. The method according to claim 8, wherein the total number of PAPR waveforms is calculated by counting a PAPR cycle in the first signal.

10. The method according to claim 8, wherein the PAPR value of each PAPR waveform is estimated from PAPR values connected in a descending order of the second signal and a binary value of 2M−1 and a binary value of '0' are mapped to PAPR waveforms having a maximum value and a minimum value, respectively among the estimated PAPR values.

11. The method according to claim 8, wherein the total number of data symbols is calculated by using a data transmission period D which is a time difference between an end of the second signal and a start of a next first signal, and a symbol duration of the PAPR waveform.

12. The method according to claim 7, further comprising:
when the receive apparatus operates in a bidirectional PAPR communication mode,
between the loading and the demodulating,
generating a PAPR preamble constituted by the PAPR waveform corresponding to at least one of a maximum value, a minimum value, and a median value among the estimated PAPR values and transmitting, to a transmission apparatus, a synchronization acknowledgment signal including the PAPR preamble and the data transmission period.

13. The method according to claim 12, further comprising:
after the transmitting of the synchronization acknowledgment signal to the transmission apparatus,
receiving, from the transmission apparatus, the PAPR waveform of the data signal during the PAPR preamble and the data transmission period.

14. The method according to claim 7, wherein the demodulating of the data symbol includes
calculating the PAPR value from the PAPR waveform of the received data signal,
comparing the calculated PAPR value, of the received data signal, with the PAPR value of the lookup table, and estimating a binary value corresponding to a PAPR value matched in the lookup table.

15. A transmission apparatus comprising:
a modulating processor configured to obtain a peak-to-average ratio (PAPR) value corresponding to each data symbol from a lookup table having a plurality of PAPR values, respectively and generate a synchronization signal configured in a random sequence based on the PAPR value of each data symbol; and
a communication processor configured to transmit the synchronization signal through an antenna,
wherein the synchronization signal is constituted by a first signal including information on timing synchronization and a second signal including information on PAPR waveform synchronization.

16. The transmission apparatus according to claim 15, wherein the communication processor is configured to:
transmit the synchronization signal during a synchronization period and transmits a PAPR waveform corresponding to the PAPR value of the data symbol during a data transmission period when operating in a unidirectional PAPR communication mode; and
transmit the synchronization signal during the synchronization period and transmits the PAPR waveform corresponding to the PAPR value of the data symbol during the data transmission period of a synchronization acknowledgment signal at the time of receiving the synchronization acknowledgment signal from a receive apparatus, when operating in a bidirectional PAPR communication mode.

17. A receive apparatus comprising:
a communication processor configured to receive a synchronization signal based on a peak-to-average ratio (PAPR) value, wherein the synchronization signal is constituted by a first signal including information on timing synchronization and a second signal including information on PAPR waveform synchronization;
an estimation processor configured to estimate a PAPR communication parameter by analyzing the synchronization signal and loading the estimated PAPR communication parameter to a lookup table; and
a PAPR demodulating processor configured to demodulate a data signal, received during a data transmission period, to a data symbol by calculating a PAPR value of the received data signal, and compare the calculated PAPR value, of the received data signal, with PAPR values of the lookup table.

18. The receive apparatus according to claim 17, further comprising:
when the receive apparatus operates in a bidirectional PAPR communication mode,
a synchronization checking processor configured to generate a PAPR preamble constituted by PAPR waveforms corresponding to a maximum value, a minimum value, and a median value among the estimated PAPR values and transmit, to a transmission apparatus, a synchronization acknowledgment signal including the PAPR preamble and the data transmission period.

19. The receive apparatus according to claim 18, wherein the communication processor is configured to receive, from the transmission apparatus, a data signal including the PAPR preamble and the PAPR waveform of the corresponding data symbol or transmit, to the transmission apparatus, a data signal including the PAPR preamble and a PAPR waveform of a data symbol to be transmitted.

* * * * *